Nov. 27, 1962 A. A. BAKER ETAL 3,066,245
RELAY LOCKOUT CHAIN CIRCUIT
Filed Jan. 4, 1960
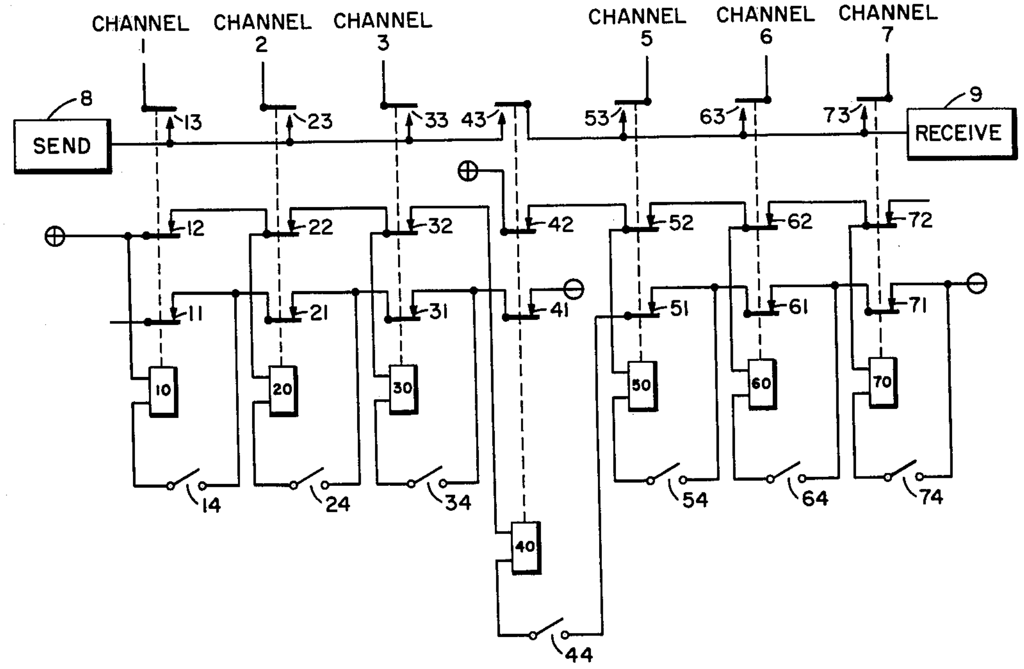
INVENTORS
ADOLPH A. BAKER
WILLIAM E. SHAFFER
BY F. H. Henson
ATTORNEY 3,066,245
RELAY LOCKOUT CHAIN CIRCUIT Adolph A. Baker and William E. Shaffer, Rochester, N.Y., assignors to General Dynamics Corporation, a corporation of Delaware Filed Jan. 4, 1960, Ser. No. 324
5 Claims. (Cl. 317—136)

This invention relates in general to switching systems and more particularly to relay lockout chain circuits for use in switching systems.

Although the invention herein disclosed has many applications, it is particularly adapted for use in teletypewriter systems. Teletypewriter systems arranged to transmit or receive over any one of a plurality of channels, say from a central office to any one of a number of stations, are well known. In such systems, means must be provided for closing a loop circuit from a teletypewriter in one of the stations to a teletypewriter in a different station for the purpose of transmitting or receiving information. Also, it may be required at times to check the transmitting units and receiving units of the teletypewriter prior to the transmission of messages to outside channels. Prior art switching systems used for teletypewriters usually comprise a simple arrangement of patch cords and phone jacks wherein any one transmitting channel may be plugged directly into a send or receive unit of the teletypewriter. Although the systems of this type are simple and direct, their main disadvantage is that a great deal of time is consumed in setting up connections, especially in central stations where a plurality of teletypewriters and a plurality of transmitting channels are employed.

Other switching systems of the prior art comprise a plurality of lever key switches or push button switches serially connected to the individual channels and the respective send or receive units of the teletypewriter. While connections may be established faster in switching systems of this type than in systems of the patch cord type, these systems have inherent characteristics that may be more troublesome than the patch cord system. For instance, by the inadverent operation of a key, a second transmitting channel may be switched to a receive unit that already is receiving from a different channel, resulting in crosstalk and cancellation of the message being transmitted, since the individual switches do not lock out the other channel switches in the circuit.

Accordingly, it is a general object of the present invention to provide a simplified form of control and supervisory circuit for an operator's position to control the routing of communication apparatus, as for instance, receive and send units of teletypewriters.

It is a more particular object of this invention to provide a relay lockout chain circuit having a minimum number of contacts on each relay and which is reliable, versatile, easily expandable, and readily adaptable for controlling and locking out functions of automatic machines.

Briefly, the present invention accomplishes the above-cited objects by providing first and second groups of relays and a master relay, all connected in a lockout chain configuration. The relays of the first group of relays individually control the connection of a teletypewriter transmitter to any one of a plurality of channels, the relays of the second group of relays individually control the connection of a teletypewriter receiver to any one of a plurality of channels, and the master relay controls the connection of the send unit to the receive unit for testing purposes. In accordance with the invention, only one relay may be operated at any given time in either the first or second group of relays and the master relay is prevented from operating when a relay is operated in either the first or second group of relays. Further, when the master relay is operated, the operation of any relay in either the first or second group is positively prevented.

Further objects and advantages of the invention will become apparent as the following description proceeds, and the features of novelty which characterize the invention will be pointed out in particularity in the claims annexed to and forming a part of this specification.

For a better understanding of the invention, reference is made to the accompanying drawing which comprises a single FIGURE on a single sheet.

The accompanying drawing discloses a relay lockout chain circuit constructed in accordance with the present invention.

Although, as previously stated, the relay lockout chain which forms the subject matter of this invention has many applications, it has been illustrated as embodied in a typical teletypewriter system. As illustrated, the teletypewriter system includes send unit 8 and receive unit 9, which may be selectively connected to send channels 1, 2, 3 and receive channels 5, 6, 7, respectively. The make contacts 13, 23, 33 on relays 10, 20, 30, respectively, are utilized to close the send unit 8 of the teletypewriter to channels 1, 2, 3, respectively, while make contacts 53, 63, and 73 on relays 50, 60, and 70, respectively, are utilized to connect receive unit 9 of the teletypewriter to channels 5, 6, and 7, respectively. The normally open make contacts 43 on relay 40 are utilized to connect the send unit 8 to receive unit 9 for testing purposes.

As illustrated, the relay lockout chain circuit is arranged to be energized by a battery providing forty-eight volts potential. In the drawing and the description which follows, the negative terminal is shown as (—) and described as negative while the positive terminal is shown as (+) and referred to as ground.

The relay lockout chain circuit in accordance with the invention comprises a first group of relays 10, 20, and 30, a second group of relays 50, 60, and 70 and a master relay 40.

To illustrate the operation of the system, first assume that it is desired to check the operation of send unit 8 and the operation of receive unit 9 of the teletypewriter before connecting the units to a distant station. When swich 44 is closed, master relay 40 is operated over a circuit extending from ground through break contacts 12, 22, and 32, its winding, switch 44, and through break contacts 51, 61, and 71 to battery. When relay 40 operates, send unit 8 is connected to receive unit 9 through make contacts 43 for testing purposes. Also, when master relay 40 is operated, each of the first group relays 10, 20, 30 is disabled since negative potential is removed from its operating circuit by break contacts 41. Similarly, when relay 40 is operated, each of the second group relays 50, 60, and 70 is disabled since ground is removed from its operating circuit by break contacts 42. After completing the test, switch 44 is opened and the circuit is now ready for the selective connection of send unit 8 and receive unit 9 to any one channel in the groups of channels 1, 2, 3, and 5, 6, 7, respectively.

The relays of the first group of relays 10, 20, and 30 individually control the connection of the send unit 8 to send channels 1, 2, and 3, respectively. Assume that it is desired to transmit from send unit 8 to channel 2 and to thus lock out channels 1 and 3 and the master relay 40. When switch 24 is closed, relay 20 is operated over a circuit extending from ground through break contacts 12, its winding, switch 24, and through break contacts 31 and 41 to battery. When relay 20 is operated, relay 10 cannot operate since negative potential is removed from its operating circuit by break contacts 21. Similarly, when relay 20 is operated, relays 30 and 40 are disabled since ground is removed from their operating circuits by break contacts 22.

While relay 20 is energized, make contacts 23 are closed, permitting the transmission of messages by the teletypewriter from send unit 8 over channel 2 to a distant station. As long as switch 24 is closed, relay 20 remains energized and in accordance with the invention, the operation of either of the switches 14 and 34, which control relays 10 and 30, respectively, of the first group of relays 10, 20, 30 or the operation of switch 44 controlling master relay 40, will not interfere with the transmission of information over channel 2 since relays 10, 30 and 40 are positively prevented from operating as previously described. Returning the switch 24 to the open position deenergizes relay 20 and returns the break contacts 21 and 22 to the normally closed positon and opens make contacts 23. Now any relay in the first group of relays 10, 20, 30 or master relay 40 may be operated in the same manner as just described.

In a similar manner, send unit 8 may transmit over channel 3 when relay 30 is operated. Provided, of course, that no relay in the first group of relays 10, 20, 30 is energized and that the master relay 40 is not energized, relay 30 is operated when switch 34 is closed. The circuit path for relay 30 extends from ground through break contacts 12, 22, relay 30 winding, switch 34 and through break contacts 41 to battery. When relay 30 is operated, relays 10 and 20 cannot operate since negative potential is removed from their operating circuits by break contacts 31. Similarly, when relay 30 is operated, master relay 40 is disabled since ground is removed from its operating circuit by break contacts 32.

The operation of the relays of the second group of relays 50, 60, 70 is similar to the operation of the relays of the first group of relays 10, 20, and 30. For example, receive unit 9 is connected to channel 6 through make contacts 63 when relay 60 is operated. Relay 60 is operated when switch 64 is closed provided no other relay in the second group of relays 50, 70 or master relay 40 is energized. The operating circuit for relay 60 may be traced from ground through break contacts 42, 52, the winding of relay 60, switch 64 and through break contacts 71 to battery. When relay 60 is operated, master relay 40 and relay 50 cannot operate since negative potential is removed from their operating circuits by break contacts 61 and relay 70 is disabled since ground is removed from its operating circuit by break contacts 62.

When switch 64 is opened, relay 60 is deenergized with the subsequent closing of break contacts 61 and 62 and the opening of make contacts 63. The relay lockout chain circuit second group of relays 50, 60, 70 and master relay 40 are now able to be individually controlled by their respective switches 54, 64, 74 and 44, respectively. Relays 50 and 70 in the second group of relays operate in a manner similar to the operation just described for relay 60.

While there has been disclosed what is at present considered to be the preferred embodiment of the invention, modifications thereto will readily occur to those skilled in the art. For example, it will be obvious to those skilled in the art that relays may be added to either group of relays 10, 20, 30 and 50, 60, 70, respectively, without adding any contacts to the relays of the lockout chain. It is not, therefore, desired that the invention be limited to the specific arrangement shown and described and it is intended in the appended claims to cover all such modifications as fall within the true spirit and scope of the invention.

What is claimed is:

1. A relay lockout chain circuit comprising first and second groups of relays and a master relay, means for selectively operating any one of the relays in said first group irrespective of the operation of any relay in said second group, means responsive to the operation of any one of the relays in said first group for preventing the operation of any other one of the relays in said first group, means for operating any one of the relays in said second group irrespective of the operation of any relay in said first group, means responsive to the operation of any one of the relays in said second group for preventing the operation of any other one of the relays in said second group, means for operating said master relay only if a relay is not operated in said first and second groups, and means responsive to the operation of said master relay for preventing the operation of any relay in said first and second groups.

2. A relay lockout chain circuit comprising first and second groups of relays and a master relay, means for selectively operating any one of the relays in said first group irrespective of the operation of any relay in said second group, means responsive to the operation of any one of the relays in said first group for preventing the operation of any other one of the relays in said first group and said master relay, means for operating any of the relays in said second group irrespective of the operation of any relay in said first group, means responsive to the operation of any one of the relays in said second group for preventing the operation of any other one of the relays in said second group and said master relay, means for operating said master relay, and means responsive to the operation of said master relay for preventing the operation of any relay in said first and second groups.

3. A relay lockout chain circuit comprising first and second groups of relays and a master relay, means for selectively operating any one of the relays in said first group irrespective of the operation of any relay in said second group, means responsive to the operation of any one of the relays in said first group for preventing the operation of any other one of the relays in said first group, means for operating any one of the relays in said second group irrespective of the operation of any relay in said first group, means responsive to the operation of any one of the relays in said second group for preventing the operation of any other one of the relays in said second group, means for operating said master relay only if a relay is not operated in said first group, and means responsive to the operation of said master relay for preventing the operation of any relay in said first and second groups.

4. A relay lockout chain circuit comprising a first relay in a first group of relays, a first relay in a second group of relays, and a master relay, each of said relays having a winding and first and second break contacts, a source of potential having first and second terminals, a switch individual to each of said relays, means for returning one terminal of the winding of said master relay through said first break contacts on said first relay in said first group of relays to said first terminal of said source of potential, means for returning the other terminal of the winding of said master relay through the switch individual to said master relay and said second break contacts on said first relay in said second group of relays to said second terminal of said source of potential, means for returning one terminal of the winding of said first relay in said first group of relays to said first terminal of said source of potential, means for returning the other terminal of the winding of said first relay in said first group of relays through said switch individual to said first relay in said first group of relays and said second break contacts on said master relay to said second terminal of said source of potential, means for returning one terminal of the winding of said first relay in said second group of relays to said second terminal of said source of potential, and means for returning the other terminal of the winding of said first relay in said second group of relays through the switch individual to said first relay in said second group of relays and said first break contacts on said master relay to said first terminal of said source of potential.

5. A relay lockout chain circuit comprising a first relay in a first group of relays, a first relay in a second group of relays, and a master relay, each of said relays having a winding and first and second break contacts, a source of potential having first and second terminals, a switch individual to each of said relays, means for interposing said first break contacts on the first relay in said first group between said first terminal of said source of potential and one terminal of the winding of said master relay, means for interposing the switch individual to said master relay and the first break contacts on the first relay in said second group between the other terminal of the winding of said master relay and the second terminal of said source of potential whereby the operation of said first relay in said first group of relays or the operation of the first relay in said second group of relays prevents the operation of said master relay, means for returning one terminal of the winding of the first relay in said first group of relays to the first terminal of said source of potential, means for interposing the switch individual to said first relay in said first group of relays and said second break contacts on said master relay between the other terminal of the winding of said first relay in said first group of relays and said second terminal of said source of potential whereby the operation of said master relay prevents the operation of said first relay in said first group of relays, means for returning one terminal of the winding of said first relay in said second group of relays to the second terminal of said source of potential, means for interposing the switch individual to said first relay in said second group of relays and said first break contacts on said master relay between the other terminal of the winding of said first relay in said second group of relays and said first terminal of said source of potential whereby the operation of the master relay prevents the operation of said first relay in said second group of relays.

References Cited in the file of this patent

UNITED STATES PATENTS

| | | |
|---|---|---|
| 2,602,150 | Hauck | July 1, 1952 |
| 2,716,206 | Salati | Aug. 23, 1955 |
| 2,922,084 | Franz | Jan. 19, 1960 |

FOREIGN PATENTS

| | | |
|---|---|---|
| 1,040,111 | Germany | Oct. 2, 1958 |

OTHER REFERENCES

Publication: "Relay Engineering," Struthers-Dunn, Inc., copyright 1945.